UNITED STATES PATENT OFFICE.

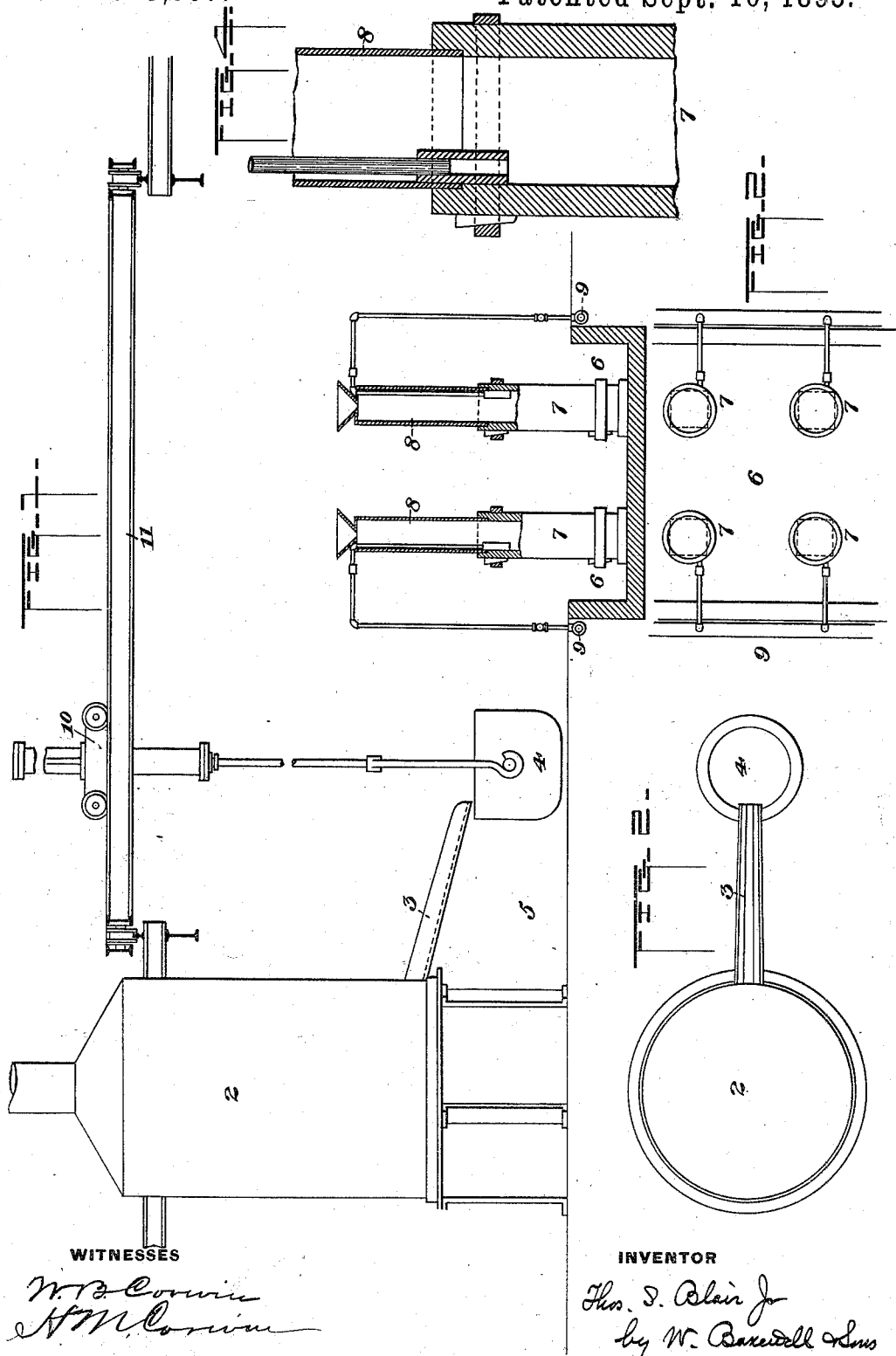

THOMAS S. BLAIR, JR., OF ALLEGHENY, PENNSYLVANIA.

PROCESS OF AND APPARATUS FOR MANUFACTURING IRON OR STEEL.

SPECIFICATION forming part of Letters Patent No. 545,937, dated September 10, 1895.

Application filed April 23, 1892. Serial No. 430,442. (No model.)

*To all whom it may concern:*

Be it known that I, THOMAS S. BLAIR, Jr., of the city of Allegheny, in the county of Allegheny and State of Pennsylvania, have invented a new and useful Improvement in the Process of and Apparatus for Manufacturing Iron and Steel, of which the following is a full, clear, and exact description, reference being had to the accompanying drawings, forming part of this specification, in which—

Figure 1 is a side elevation of a metallurgical plant embodying apparatus adapted to the practice of my invention. Fig. 2 is a plan view of the molds. Fig. 3 is a diagram plan view of the melting-furnace and ladle. Fig. 4 is a detail view, on a larger scale, of the nozzle for introducing reducing-gas into the mold.

This invention relates to the manufacture of wrought iron or steel direct from the oxides of iron; and it consists in combining in one receptacle the functions, first, of a reducing-chamber wherein the oxide previously melted and introduced into it in a fluid state is reduced to the metallic state, and, second, of an ingot-mold wherein the metal solidifies and whence it is readily removed, when solid, in the shape of an ingot.

In certain Letters Patent No. 310,164, granted to Charles Adams, January 6, 1885, there is described a process for the reduction of the oxides of iron by melting the same and from the molten mass precipitating the metal by agitating the liquid by a blast of reducing-gases introduced into the same under pressure. This process has proved to be subject to practical defects, owing to the remarkable rapidity with which the reduction takes place under the circumstances described. It was found that the particles of metallic iron were precipitated upon the surface of the hearth of the furnace and froze there before they had time to take up any perceptible amount of carbon. The metal in this condition was incapable of remaining fluid, except at a very high temperature, and consequently accumulated as a solid mass of iron rooted into the crevices of the furnace-bottom.

The invention herein described is intended as an improvement upon the above-described process of Adams, obviating the difficulties arising from the instantaneous precipitation of the metal by providing, as stated, a receptacle for the particles of metal as they are thrown down from the cinderous fluid, in which receptacle they accumulate as a solid mass built up within a mold from which, when the operation has been completed, the contained ingot of wrought-iron can be withdrawn and used as an ingot for the manufacture of steel in an open-hearth furnace, or for any other purpose to which it may be adapted.

The accompanying drawings illustrate the manner in which I reduce my invention to practice.

1 represents the apparatus at large.

2 is a cupola-furnace in which the ore, cinder, or other oxide of iron may be melted; but instead of a cupola, any other form of melting-furnace, or any other means or mode of melting that special circumstances may render preferable, may be employed.

3 is the spout or runner which conveys the melted oxide into the ladle 4.

5 represents the ladle-pit, 6 the casting-pit.

7 7 are the molds, to each of which is attached a removable extension 8, the use of which will be explained presently.

9 is a pipe for conveying the gaseous reducing agent which is to agitate the fluid oxide and cause the precipitation of the iron therefrom. As such reducing agent I may use any of the well-known reducing gases or vapors or mixtures thereof—such as hydrogen, hydrocarbons, water-gas, producer-gas, carbonic oxide, &c.

10 is the trolley of a crane 11, which handles the ladle 4 with its contents, so that the latter can be delivered rapidly into the molds.

From this description of the apparatus the method of operation can be readily understood. The ore or other oxide is charged, along with suitable fluxes—such as limestone—into the melting-furnace 2, and thence tapped off when fluid into the ladle 4, which latter is then lifted by the crane 11 and presented in the proper positions, successively, to serve each of the molds 7 7. When the cindery liquid or oxide is about to be poured into a mold, the gas is turned on in that mold through the pipe 9, so that the descending shower of molten oxide is met by an ascending current of reducing-gas.

The end of the gas-pipe 9 is provided with a refractory nozzle, Fig. 4, and is so placed as regards the metal in the mold that it will not reach down as far as the metal when the latter is at its maximum, but will not much more than clear it, in order that the fluid mass may receive the utmost measure of treatment by the gas that is consistent with the avoidance of the freezing of the metal around the pipe. When the fluid in the ingot-mold reaches a level above the mouth of the gas-pipe and continues to rise higher and higher, a fierce ebullition takes place, causing the mass to swell suddenly and greatly. It is to provide against the overflow which this heaving of the mass would otherwise cause that the extension 8 is placed upon the mold. This extension, being made of wrought-iron or mild steel, is comparatively light and easily put on or taken off. The pressure of the in-flow of gas is regulated according to the violence of the ebullition of the contents of the mold and its extension, and the time for shutting off the gas altogether will be indicated at the outset by the condition of the cinder, and subsequently be regulated by the time of the blow, according to experience. As soon as the stage has been reached at which the cinder indicates a satisfactory removal of the iron, and the gas has accordingly been shut off, nothing remains but to clear up the casting-pit and prepare for another run.

By this method a kind of wrought-iron can be obtained remarkably free from every form of contamination and without trace of either silicon or carbon. If, for any reason, it is desirable to have an infusion of carbon in the ingots, it can be obtained, up to certain limits, by bringing the reduced metal into contact with solid carbonaceous material, introduced in any suitable manner—e. g., either by blowing in along with the gas pulverized solid carbon or by placing carbonaceous matter in the form of an adhesive lining in the bottom and on the sides of the molds. This carburizing operation may be assisted by causing the molds to stand in a heated chamber, from the roof of which only their mouths emerge. In this case, instead of being made of cast-iron, as they may otherwise be, they must be made of refractory material. The dissociation of the oxygen from the iron may be accelerated by introducing into the blast of reducing-gas, according to familiar methods, pulverized carbonaceous matter.

A modification of this process may be employed as follows: Instead of using split molds of the ordinary form to perform the functions of a manipulating-chamber and a receptacle for the metal thrown down by the chemical reactions, as above described, the mold may be flattened out, as it were, into the form of a comparatively shallow box of cast-iron, made up of two or more sections, so that when the fastenings which hold them together are loosened the contained ingot, block, or slab of metal can be readily removed and the mold speedily readjusted for another cast. In this case the gas or mingled gas and carbon powder may be injected into the fluid oxide by means of a hollow tool at the end of a flexible hose operated by hand.

In the foregoing specification I have described my method and the apparatus for its practice in what I believe to be the forms best suited for industrial working; but I wish it to be understood that without variance from my invention modifications may be made in the working details of the method and in the construction of the apparatus.

By the term "oxide of iron" used in the following claims I intend to include not only native ores of iron, but cinders and other oxygen compounds of iron which are of such nature as to make it possible to effect their reduction by gaseous and carbonaceous reducing agents.

I claim—

1. The process of producing iron ingots direct from the oxide of iron by pouring the oxide in a fluid state into a mold, there dissociating the oxygen from the iron by subjecting the fluid mass to a blast of reducing-gas introduced thereinto, and permitting the metal to solidify in the mold; substantially as and for the purposes described.

2. The process of producing ingots of steel direct from the oxide of iron by pouring the oxide in a fluid state into a mold and there dissociating the oxygen from the iron by subjecting the fluid mass to a blast of reducing-gas introduced thereinto, causing the incorporation of carbon into the metal, by subjecting it to contact with solid carbonaceous matter and permitting the metal to solidify in the mold; substantially as and for the purposes described.

3. The process of producing ingots of wrought-iron or of steel direct from the oxide of iron by pouring the oxide in a fluid state into the ingot-mold and there dissociating the oxygen from the iron by subjecting it to a blast of mingled reducing-gas and pulverized carbonaceous matter and permitting the metal to solidify in the mold; substantially as and for the purposes described.

4. In apparatus for the reduction of metallic oxide, the combination of a mold adapted to receive the molten oxide, a pipe adapted to discharge reducing gas thereinto, and a removable extension, extending upwardly from the mold, and adapted to permit ebullition without waste of metal; substantially as described.

In testimony whereof I have hereunto set my hand this 20th day of April, A. D. 1892.

THOS. S. BLAIR, JR.

Witnesses:
HAZEN BROWN,
W. B. CORWIN.